UNITED STATES PATENT OFFICE.

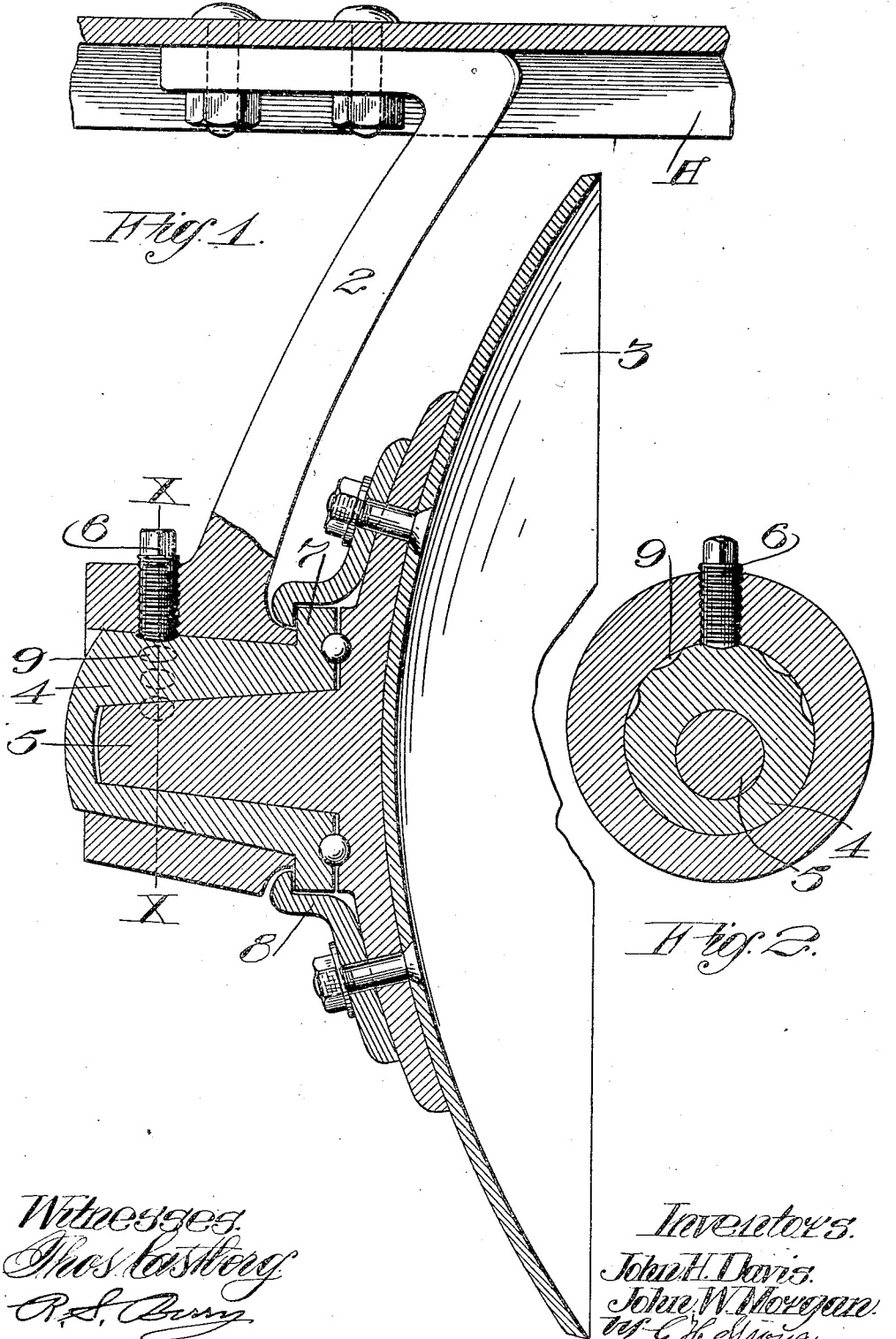

JOHN H. DAVIS, OF OAKLAND, AND JOHN W. MORGAN, OF ELMHURST, CALIFORNIA.

DISK PLOW.

1,042,651.　　　　　　Specification of Letters Patent.　　Patented Oct. 29, 1912.

Application filed March 28, 1912. Serial No. 686,863.

*To all whom it may concern:*

Be it known that we, JOHN H. DAVIS, of Oakland, Alameda county, State of California, and JOHN W. MORGAN, of Elmhurst, Alameda county, State of California, both citizens of the United States, have invented new and useful Improvements in Disk Plows, of which the following is a specification.

Our invention relates to disk plows and cultivators, and pertains especially to an eccentric bushing or boxing for the purpose of changing the angle of the disk.

The invention consists of the parts and the construction and combination of parts, as hereinafter more fully described and claimed, having reference to the accompanying drawings, in which—

Figure 1 is a side elevation partly in section. Fig. 2 is a cross section on line X—X, Fig. 1.

A represents the frame of a disk plow or cultivator, having the arms or brackets 2 carrying the disks 3.

The invention resides in the use of a bushing or boxing 4 in which the spindle or arbor 5 of the disk is journaled eccentrically. Preferably this boxing or bushing 4 is in the form of a truncated cone fitting in a corresponding seat in the end of the bracket 2 and adapted to be held securely in place by suitable means, as the set-screw 6. The end of the bushing toward the disk 3 has an annular flange 7 forming a shoulder, behind which the brackets 8 on the disk engage and hold the disk in revoluble and secure position.

The essential feature of this invention is the journaling of the disk eccentrically in the bushing and the making of the bushing circumferentially adjustable so that by turning the bushing more or less in one direction or the other, the angle of the disk either horizontally, vertically or otherwise may be altered so as to adapt the disk to different conditions and different kinds of soils. Experience shows that different conditions and kinds of soils require different angles or adjustments of the disks, and in practice we have found that this eccentric bushing provides a simple and ready means for adapting the disks to all these varying conditions.

In order to securely hold the bushing in place, we prefer to form little pockets 9 at regular intervals around the bushing in the path of the pointed set-screw 6 for the end of the set-screw to seat in; these pockets or indentations 9 being so spaced as to correspond to certain predetermined angular adjustments of the disk.

Having thus described our invention, what we claim and desire to secure by Letters Patent, is—

In a disk plow in combination, a disk, an arbor attached to said disk and adapted to form a journal for the disk, a conoidal bushing forming a journal bearing for said arbor, said bushing being formed of a substantially smooth exterior surface the axis of which is eccentric with reference to the axis of the bearing for said arbor, a support adapted to form a seat in which said bushing is rotatively mounted for the purpose of adjustment, and a set screw passing through said support and adapted to contact with said bushing to clamp the same in a direction substantially coincident with the direction of pressure when said disk is in normal operation.

In testimony whereof we have hereunto set our hands in the presence of two subscribing witnesses.

JOHN H. DAVIS.
　　　　　　　　　　JOHN W. MORGAN.

Witnesses:
　J. HOWE WEBSTER,
　GEO. L. WOLF.